United States Patent
Laaksonen et al.

(10) Patent No.: US 12,464,304 B2
(45) Date of Patent: Nov. 4, 2025

(54) OBTAINING CALIBRATION DATA FOR CAPTURING SPATIAL AUDIO

(71) Applicant: Nokia Technologies Oy, Espoo (FI)

(72) Inventors: Lasse Juhani Laaksonen, Tampere (FI); Arto Juhani Lehtiniemi, Tampere (FI); Mikko Olavi Heikkinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 200 days.

(21) Appl. No.: 18/409,233

(22) Filed: Jan. 10, 2024

(65) Prior Publication Data

US 2024/0259745 A1 Aug. 1, 2024

(30) Foreign Application Priority Data

Jan. 27, 2023 (EP) .................................... 23153632

(51) Int. Cl.
| | | |
|---|---|---|
| H04S 7/00 | (2006.01) | |
| H04N 23/62 | (2023.01) | |
| H04N 23/69 | (2023.01) | |
| H04R 3/00 | (2006.01) | |
| H04R 5/027 | (2006.01) | |

(52) U.S. Cl.
CPC .............. H04S 7/30 (2013.01); H04N 23/62 (2023.01); H04N 23/69 (2023.01); H04R 3/005 (2013.01); H04R 5/027 (2013.01); *H04S 2400/11* (2013.01); *H04S 2400/15* (2013.01)

(58) Field of Classification Search
CPC .......... H04S 7/30; H04R 3/005; H04N 23/69; H04N 23/62
USPC ................................. 381/1, 56, 58, 122, 124
See application file for complete search history.

(56) References Cited

U.S. PATENT DOCUMENTS

| | | | | |
|---|---|---|---|---|
| 8,599,320 | B2* | 12/2013 | Tsurumi | H04S 7/30 |
| | | | | 345/474 |
| 9,258,644 | B2* | 2/2016 | Maenpaa | H04R 3/005 |
| 11,375,120 | B2* | 6/2022 | Wang | H04N 23/64 |
| 12,267,591 | B2* | 4/2025 | Liu | H04N 23/633 |
| 2013/0342731 | A1* | 12/2013 | Lee | H04R 5/04 |
| | | | | 348/231.4 |

FOREIGN PATENT DOCUMENTS

GB 2618384 A 11/2023

OTHER PUBLICATIONS

Extended European Search Report received for corresponding European Patent Application No. 23153632.7, dated Jul. 24, 2023, 10 pages.

* cited by examiner

*Primary Examiner* — William A Jerez Lora
(74) *Attorney, Agent, or Firm* — Nokia Technologies Oy

(57) ABSTRACT

A method comprising determining that calibration data is to be obtained, by a user device, wherein the calibration data is for generating spatial audio content, determining that a first user input is received by the user device, wherein the first user input causes a zooming operation to be performed for video content that is being captured by the user device, adding a deviation to the zooming operation, determining that a user second input is received by the user device, as a response to adding the deviation, wherein the second user input mitigates, at least partly, an effect caused by the deviation, and in response to the second user input, obtaining the calibration data by capturing audio content using a plurality of microphones.

20 Claims, 8 Drawing Sheets

OBTAINING CALIBRATION DATA FOR CAPTURING SPATIAL AUDIO

RELATED APPLICATION

This application claims priority to European Patent Application No. 23153632.7, filed Jan. 27, 2023, which is incorporated herein by reference in its entirety.

FIELD

The present application relates to capturing media content using a device used by a user.

BACKGROUND

Media content may be captured, stored and consumed using devices that can be used by a user, such as, mobile devices and optionally also cloud computing. The capability of mobile devices to capture media content that may comprise audio content or video content or a combination of both increases. Therefore, the devices may also capture media content comprising spatial audio. It is therefore beneficial to optimize the capturing of the media content such that the quality of the captured content as good as possible.

BRIEF DESCRIPTION

The scope of protection sought for various embodiments is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for performing: determining that calibration data is to be obtained, by a user device, wherein the calibration data is for generating spatial audio content, determining that a first user input is received by the user device, wherein the first user input causes a zooming operation to be performed for video content that is being captured by the user device, adding a deviation to the zooming operation, determining that a user second input is received by the user device, as a response to adding the deviation, wherein the second user input mitigates, at least partly, an effect caused by the deviation, and in response to the second user input, obtaining the calibration data by capturing audio content using a plurality of microphones.

In some example embodiments according to the first aspect, the means comprises at least one processor, and at least one memory storing instructions that, when executed by the at least one processor, to cause the performance of the apparatus.

According to a second aspect there is provided an apparatus comprising at least one processor, and at least one memory storing instructions that, when executed by the at least one processor, to cause the apparatus at least to: determine that calibration data is to be obtained, by a user device, wherein the calibration data is for generating spatial audio content, determine that a first user input is received by the user device, wherein the first user input causes a zooming operation to be performed for video content that is being captured by the user device, add a deviation to the zooming operation, determine that a user second input is received by the user device, as a response to adding the deviation, wherein the second user input mitigates, at least partly, an effect caused by the deviation, and in response to the second user input, obtain the calibration data by capturing audio content using a plurality of microphones.

According to a third aspect there is provided a method comprising: determining that calibration data is to be obtained, by a user device, wherein the calibration data is for generating spatial audio content, determining that a first user input is received by the user device, wherein the first user input causes a zooming operation to be performed for video content that is being captured by the user device, adding a deviation to the zooming operation, determining that a user second input is received by the user device, as a response to adding the deviation, wherein the second user input mitigates, at least partly, an effect caused by the deviation, and in response to the second user input, obtaining the calibration data by capturing audio content using a plurality of microphones.

In some example embodiments according to the third aspect the method is a computer implemented method.

According to a fourth aspect there is provided a computer program comprising instructions which, when executed by an apparatus, cause the apparatus to perform at least the following: determine that calibration data is to be obtained, by a user device, wherein the calibration data is for generating spatial audio content, determine that a first user input is received by the user device, wherein the first user input causes a zooming operation to be performed for video content that is being captured by the user device, add a deviation to the zooming operation, determine that a user second input is received by the user device, as a response to adding the deviation, wherein the second user input mitigates, at least partly, an effect caused by the deviation, and in response to the second user input, obtain the calibration data by capturing audio content using a plurality of microphones.

According to a fifth aspect there is provided a computer program comprising instructions stored thereon for performing at least the following: determining that calibration data is to be obtained, by a user device, wherein the calibration data is for generating spatial audio content, determining that a first user input is received by the user device, wherein the first user input causes a zooming operation to be performed for video content that is being captured by the user device, adding a deviation to the zooming operation, determining that a user second input is received by the user device, as a response to adding the deviation, wherein the second user input mitigates, at least partly, an effect caused by the deviation, and in response to the second user input, obtaining the calibration data by capturing audio content using a plurality of microphones.

According to a sixth aspect there is provided a non-transitory computer readable medium comprising program instructions that, when executed by an apparatus, cause the apparatus to perform at least the following: determine that calibration data is to be obtained, by a user device, wherein the calibration data is for generating spatial audio content, determine that a first user input is received by the user device, wherein the first user input causes a zooming operation to be performed for video content that is being captured by the user device, add a deviation to the zooming operation, determine that a user second input is received by the user device, as a response to adding the deviation, wherein the second user input mitigates, at least partly, an effect caused by the deviation, and in response to the second user input, obtain the calibration data by capturing audio content using a plurality of microphones.

According to a seventh aspect there is provided a non-transitory computer readable medium comprising program instructions stored thereon for performing at least the following: determining that calibration data is to be obtained, by a user device, wherein the calibration data is for generating spatial audio content, determining that a first user input is received by the user device, wherein the first user input causes a zooming operation to be performed for video content that is being captured by the user device, adding a deviation to the zooming operation, determining that a user second input is received by the user device, as a response to adding the deviation, wherein the second user input mitigates, at least partly, an effect caused by the deviation, and in response to the second user input, obtaining the calibration data by capturing audio content using a plurality of microphones.

According to an eighth aspect there is provided a computer readable medium comprising program instructions that, when executed by an apparatus, cause the apparatus to perform at least the following: determine that calibration data is to be obtained, by a user device, wherein the calibration data is for generating spatial audio content, determine that a first user input is received by the user device, wherein the first user input causes a zooming operation to be performed for video content that is being captured by the user device, add a deviation to the zooming operation, determine that a user second input is received by the user device, as a response to adding the deviation, wherein the second user input mitigates, at least partly, an effect caused by the deviation, and in response to the second user input, obtain the calibration data by capturing audio content using a plurality of microphones.

According to a ninth aspect there is provided a computer readable medium comprising program instructions stored thereon for performing at least the following: determining that calibration data is to be obtained, by a user device, wherein the calibration data is for generating spatial audio content, determining that a first user input is received by the user device, wherein the first user input causes a zooming operation to be performed for video content that is being captured by the user device, adding a deviation to the zooming operation, determining that a user second input is received by the user device, as a response to adding the deviation, wherein the second user input mitigates, at least partly, an effect caused by the deviation, and in response to the second user input, obtaining the calibration data by capturing audio content using a plurality of microphones.

DETAILED DESCRIPTION

Figure 1:
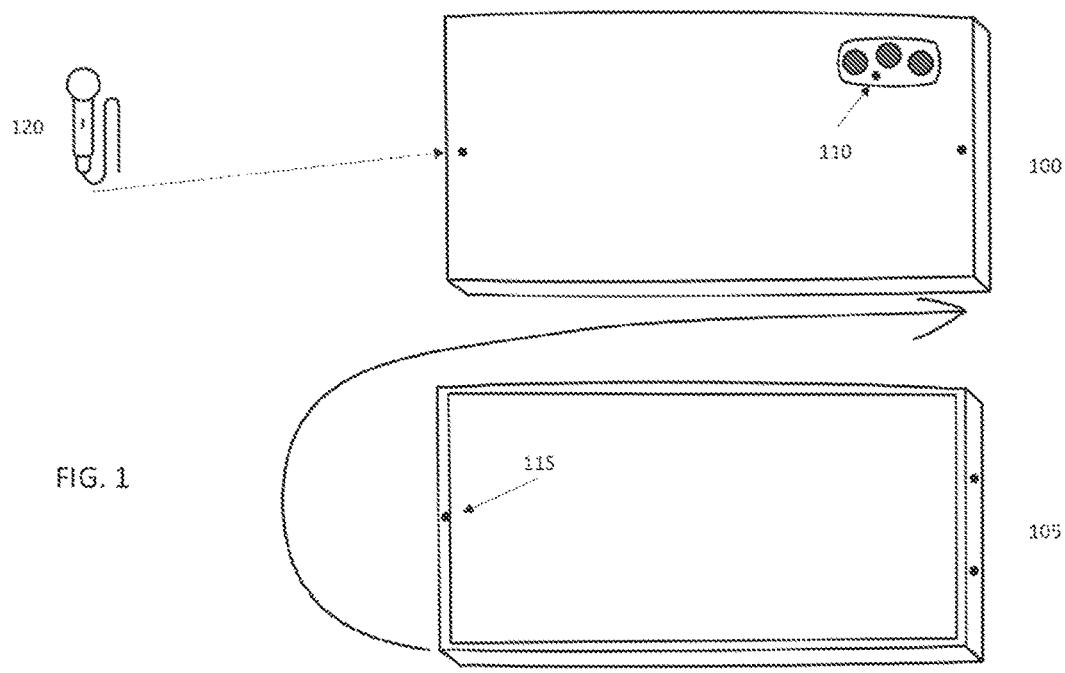
FIG. 1 illustrates an example embodiment of a user device that may be used for capturing audio for generating spatial audio content.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

As used herein, the term "determining" (and grammatical variants thereof) can include, not least: calculating, computing, processing, deriving, measuring, investigating, looking up (e.g., looking up in a table, a database or another data structure), ascertaining and the like. Also, "determining" can include receiving (e.g., receiving information), accessing (e.g., accessing data in a memory), obtaining and the like. Also, "determining" can include resolving, selecting, choosing, establishing, and the like.

Spatial audio is a form of media content and may be referred to as spatial audio content. Spatial audio content may be combined with other media contents, such as video content, or it may be provided as such. Spatial audio may be understood as audio that has a 3D quality that allows to provide a user experience with a stronger sense of depth, width, and/or height than for example stereo audio. Spatial audio may be represented using various formats, such as Ambisonics or Metadata-assisted spatial audio (MASA). For example, MASA is a parametric format comprising transport audio signals and metadata. Its spatial metadata comprises for example information regarding directions and energy ratios per time-frequency tiles.

Spatial audio content may be consumed and captured by a device that is operated by a user and may thus be referred to as a user device. Such user device may be a mobile device such as a mobile phone, a wearable device, a camera device or a tablet computer. For example, spatial audio media content may be utilized to define an audio scene that is around the user device by configuring the user device to capture the audio scene around it. Similarly, when delivering the spatial audio content, it may render an audio scene around the user who listens to the spatial audio content. For the listening, the spatial audio content may be rendered, for example, to a loudspeaker setup, such as a 5.1 or 7.1+4 loudspeaker setup. Alternatively, the spatial audio content may be rendered binaurally to headphones. If headphones are used by the user for listening, a more immersive user experience may be provided to the user if head-tracking is additionally supported by the user device and combined with the rendering of the spatial audio content.

For capturing an audio scene such that spatial audio may be generated, the user device may receive input, that is audio input, from a plurality of microphones.

The microphones may be comprised in the user device, or the user device may be connected to the microphones or there may be at least one microphone comprised in the user device and at least one microphone to which the user device is connected to. FIG. 1 illustrates an example embodiment of a user device that may be used for capturing audio for generating spatial audio content. The user device in this example embodiment is a mobile phone. On the back side 100 of the mobile phone there are one or more cameras along with one microphone 110 which are comprised in the mobile phone. On the front side 105 of the mobile phone there is one additional microphone 115 that is comprised in the mobile phone. Optionally, the mobile phone may also be connected to an external microphone 120 that may be understood as an accessory device as well. The microphones 110, 115 and 120 may thus be used by the mobile phone to obtain audio input for capturing audio used for generating spatial audio content.

For generating the spatial audio content, a capture algorithm, which may be comprised in a model such as a machine learning model, may be utilized. The capture algorithm may require data for calibration such that the capturing may then be performed such that the captured audio is suitable for generating the spatial audio content. The spatial audio content may then be generated using the model that may be created in a server, for example using cloud computing. The creation, as well as calibration, of the model and its updates can be done in the background. Updates may be required for example, when a new device, such as a microphone that is an accessory, is taken into use. Also, a set of profiles that based on certain accessory setup, may be learnt.

Figure 2:
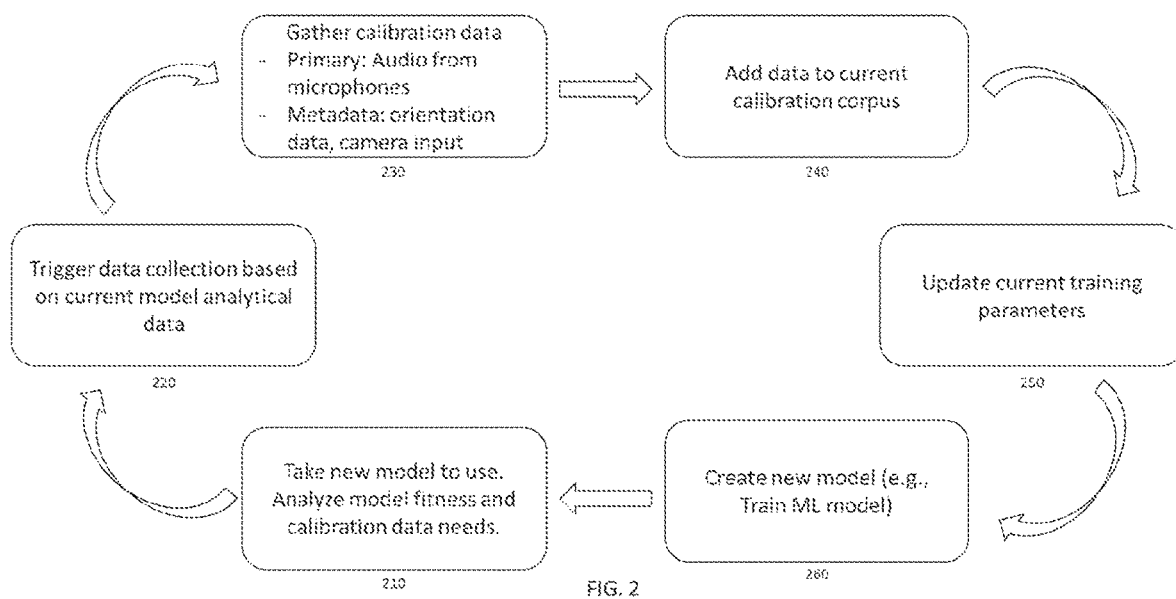
FIG. 2 illustrates an example embodiment that is a generalization of a process for training a model that may be used for generating spatial audio content.

FIG. 2 illustrates an example embodiment that is a generalization of a process for training a model that may be used for generating spatial audio content. In this process, the model, that may be a machine learning model, is created and, using the process in an iterative manner, may also be updated as needed. In step 210, the model is first taken into use and thus it is a new model that is taken into use and its fitness as well as requirements for calibration data are analysed.

Then, in step 220, based on the analysis performed regarding requirements for calibration data, data collection may be triggered. As a consequence of triggering the data collection, in step 230 calibration data is obtained. For example, calibration data may be gathered using audio that is received by a user device from a plurality microphones. Such audio may be regarded as primary data for calibration. Metadata regarding the audio, such as orientation related data and input data from a camera while receiving the audio as input as well, may also be obtained. It is to be noted that the obtained data is to be suitable for the purpose, for example, to have features sufficient for directional information, in other words, sources in various directions relative to the user device that performs capturing of audio. It is to be noted that optionally, obtaining the data for calibration from the plurality of microphones further comprises constructing the data for the calibration based on signals obtained from, and captured by, the microphones. The obtained data for calibration may then be added, in step 240, to a current calibration corpus and, in step 250, current parameters used for training the model, may be updated. Then, in step 260, the new model that may be used for generating spatial audio content, may be created by for example training the machine learning model. After the step 260, the process may return to step 210.

For obtaining data for calibration of a model used for generating spatial audio content based on audio input captured using a plurality of microphones, the user device may be caused to listen to audio in the background. For example, an application that is installed in the user device and is capable of capturing spatial audio by for example executing the capture algorithm and capturing audio using multiple microphones, may have a passive calibration phase during which it listens to audio in the background to determine the acoustic characteristics of the user device that are required for adapting the capture algorithm to the user device. The calibration is useful for example when the application is installed to the user device such that the application understands the user device to be a new device to which it has not been calibrated yet. This may be for example when the application is installed to the user device for the first time, or the application is taken into use for the first time or after an update of the user device.

If it is determined, by the application for example, that the user device does not have sufficient spatial audio calibration data, it may not be possible to perform the calibration. Thus, more data may be needed at various times. The calibration data should have suitable characteristics, such as sufficiently varied directional information. Therefore, the orientation of the capture device in the scene, which comprises an audio scene, being captured determines, at least partly, the suitability of the captured data for generating the spatial audio content.

For example, as a user is capturing a video scene, the sound scene may not provide good calibration data in the current orientation of the user device that is used to capture the video scene. This may be the case for example when the user device does not move enough as the movement of the user device is to be sufficient such that audio can be captured on multiple different orientations of the user device. The captured audio, that may be audio as such or part of audio-visual content, may then be used as data for calibration. Also, the orientations are to be apart enough from each other and therefore the user device is to be moved enough for obtaining the data for calibration. As such, it may not be possible to perform calibration of the capture algorithm to capture the audio scene for generating the spatial audio content, and therefore the user capturing the video scene may not get the immersive sound content with the captured video the user was hoping to have. On the other hand, requesting the user to start some type of manual calibration would stop user from capturing the moment, which could lead to an undesirable user experience.

For obtaining calibration data, in other words data for calibration, that is for generation of spatial audio content based on captured audio, which may be comprised in a captured audio-visual content, output for a user may be provided that causes the user to modify the process of capturing video by for example rotating a user device that the user uses for capturing the video. The output may be for example visual output caused by adding a deviation to a response caused by an input from a user. An example embodiment of causing modification to the way the user is capturing video content so that calibration data may be obtained, is illustrated in the FIG. 3A-3E.

Figure 3A:
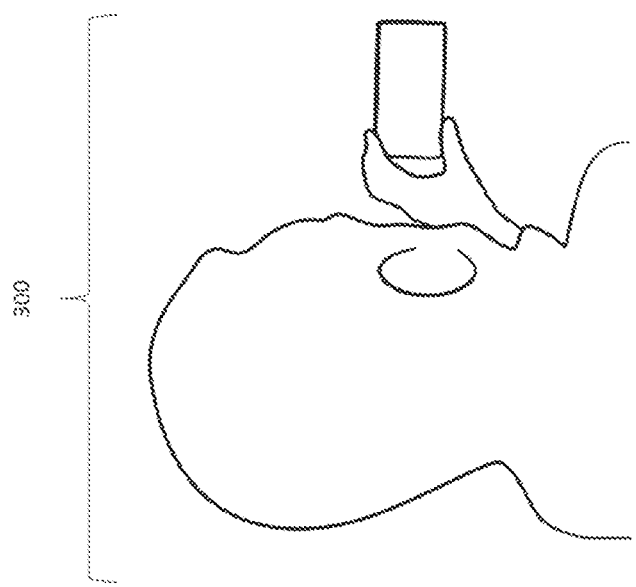
FIG. 3A-3E illustrate an example embodiment of causing modification to the way the user is capturing video content so that calibration data may be obtained.
Figure 3A:
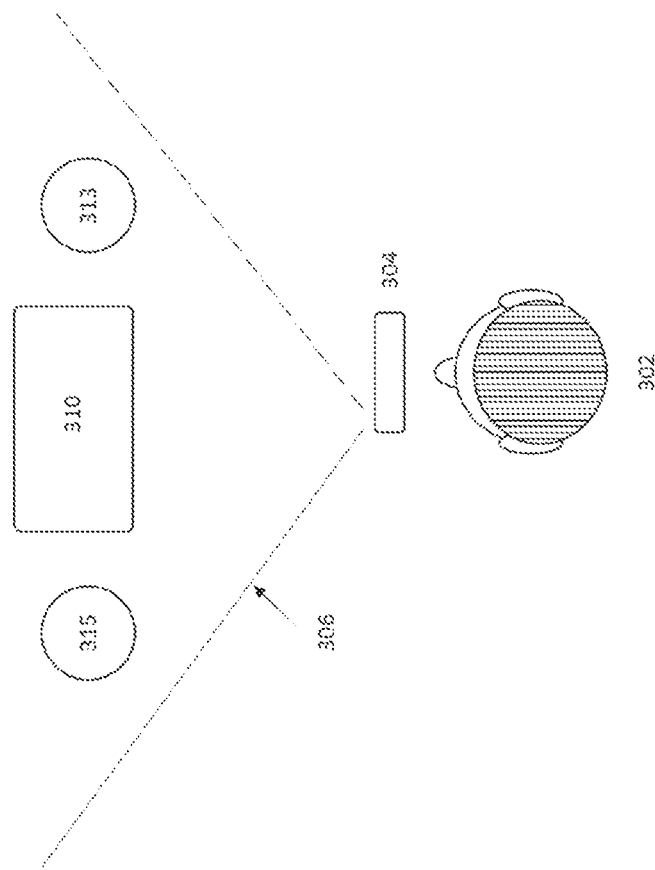

It first is determined, by the user device, that data for calibration is to be obtained for capturing audio content that is for generating spatial audio content. It is to be noted that the determination may also comprise obtaining information, from a server for example, that the new data for calibration is required. The determination may be based on current status regarding audio capture and a current status of availability of calibration data. In FIG. 3A it is illustrated that video content may be captured 300 by a user 302 using a user device 304. In other words, the user device 304 is configured to capture video content. If the user device 304 does not have sufficient calibration data available and the user 302 is maintaining substantially static capture angle, in other words, keeping an object of interest 310 in the field of view 306 of the camera of the user device 304, spatial audio capture may not be possible. Instead, for example mono or stereo audio may be captured.

In this example embodiment, the video capture is utilized such that as a user performs a zoom operation during the video capture, the zoom operation may be modified such that the user 302 may be subtly guided to move and/or turn the user device 304 to maintain the object of interest 310 correctly framed. This allows to capture spatial sound sources from more diverse directions, which may mean in some use cases better left-right separation for example, and which provides the spatial audio calibration with the kind of calibration data that is required for the calibration corpus. In this example embodiment, the object of interest 310 and its related sound sources 313 and 315 are within the field of view of 306 of a camera comprised in the user device 304. The sound sources 313 and 315 may be originating from the object of interest 310.

In this example embodiment, the capture algorithm calibration and optionally also model creation, may be performed using machine learning on a server. The server may also collect data, such as audio recordings and/or features relating to such recordings, from the user device. For example, the user device 304, which may be a user device according to the example embodiment of FIG. 1, may obtain audio data as input from a plurality of microphones and provide audio data to the server, which then determines the suitable spatial audio capture model for the user device 304. The user device 304 then receives the pertinent model parameters allowing it to generate spatial audio content based on audio data obtained from the plurality of microphones. The spatial audio content may be for example in accordance with MASA format.

Figure 3B:
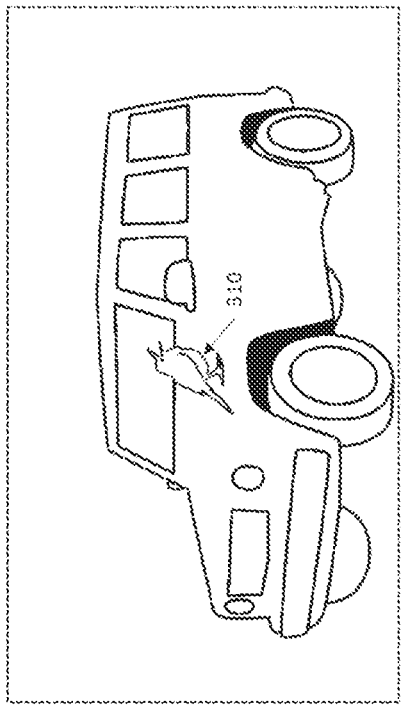
Figure 3B:
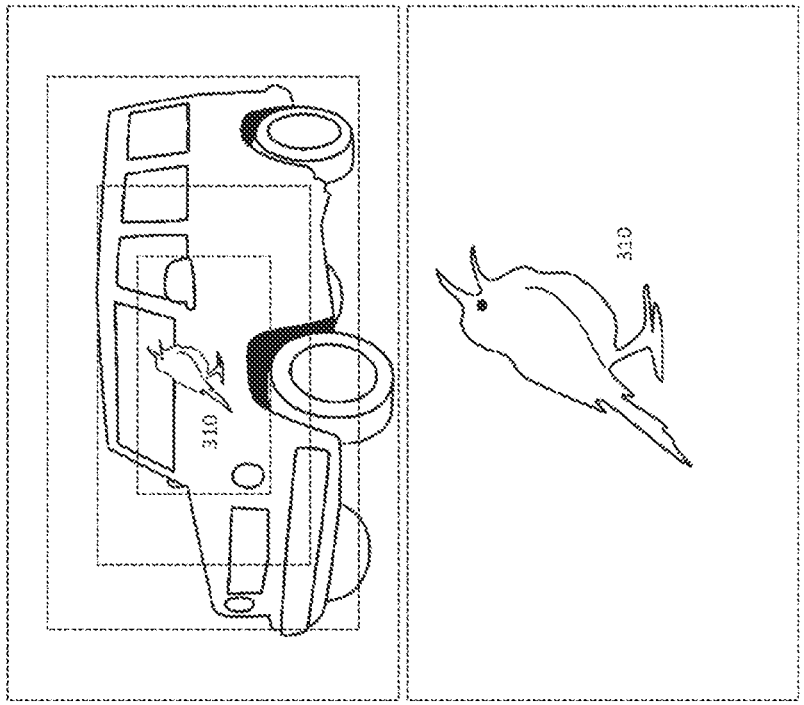

FIG. 3B illustrates how the user wishes to zoom in on the object of interest 310, which in this example embodiment is a bird. Alternatively, the object of interest 310 may be the car and the bird may be part of the object of interest 310. The user 302 thus provides input for zooming in on the object of interest 310 such that the zooming is carried out relative to the center of the field of view 306. FIG. 3B illustrates the initial zoom level 312 in which the car and the bird are visible, then a progression of the zooming 314 and the final zoom level 316. In the final zoom level 316 the bird is still fully visible and in the center of the field of view.

Figure 3C:
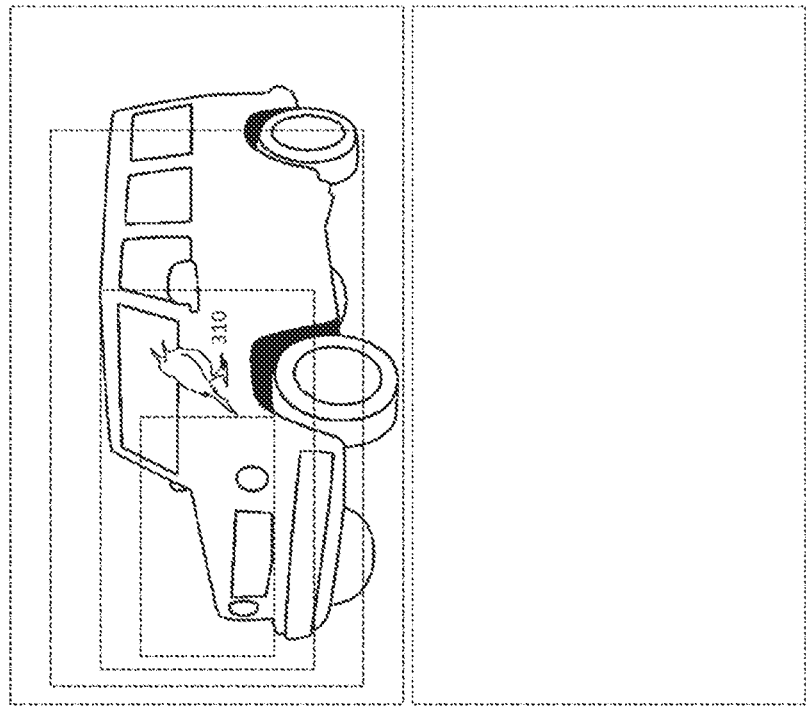
Figure 3C:
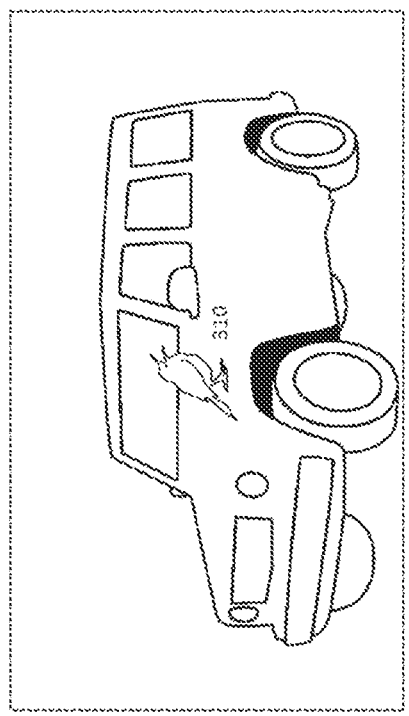

FIG. 3C illustrates another zooming that is performed by the user device 304 as a response to the user input received and causing the zooming of the video being captured using the user device 304. In this example embodiment, the user device is caused to perform the zooming such that a deviation for the center of the field of view is added to the zooming being performed. The center of the field of view may be understood to be the center of the field of view at the moment the user input for zooming is received. In other words, as the user zooms in during the video capture, the user device begins to adjust the region of the image (relative to the "original wide view") to which the zooming is being performed.

In FIG. 3C there is still the bird as the object of interest 310 as is illustrated by first zoom level 322. The deviation added to the input, that is user input, and which causes zooming of the video content that is being captured, causes a non-central part of the field of view to be the center for the zooming as is illustrated by the second zooming level 324. Thus, the bird might not even be visible at the final zoom level 326.

Figure 3D:
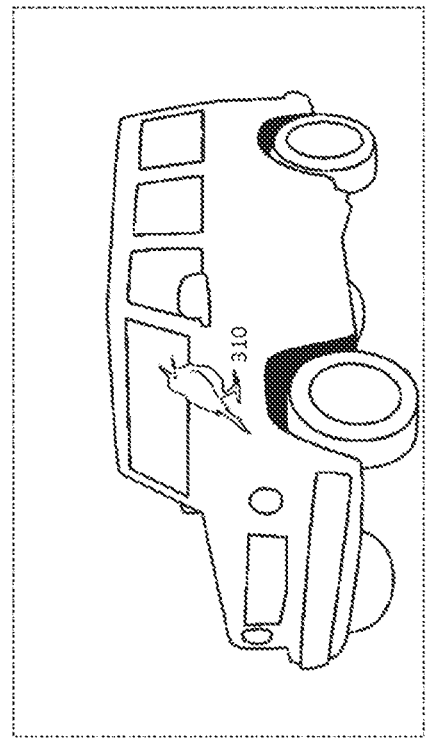
Figure 3D:
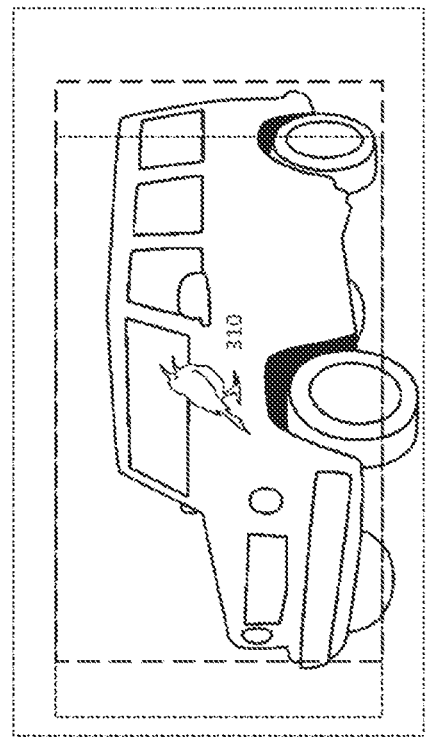
Figure 3D:
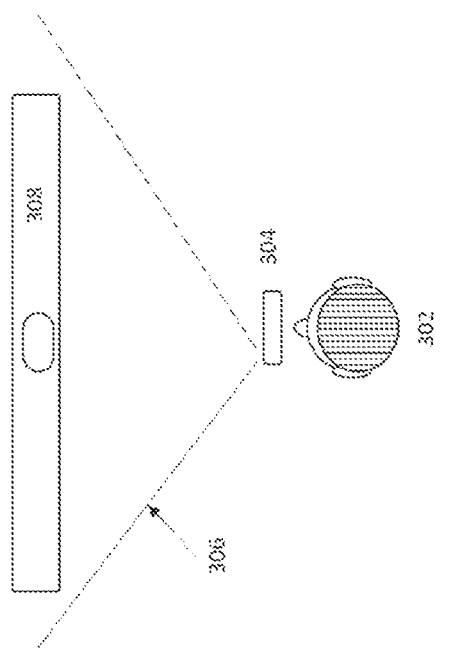
Figure 3D:
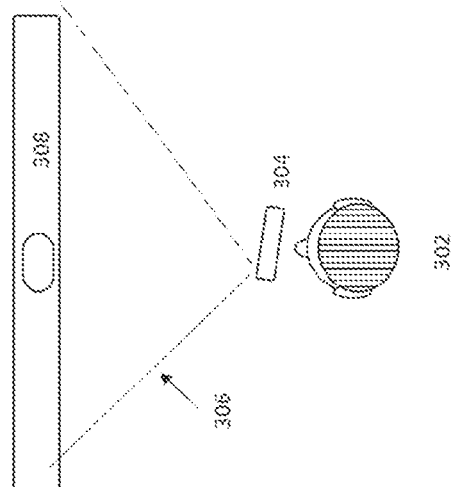

During the zooming being performed, the user 302 may provide further input, in other words, further user input, for mitigating the effect, which may be a visual effect, of the deviation that was added. In other words, the user 302 may try to return the center of the field of view to the object of interest 310. As illustrated in FIG. 3D, the user 302 may actively provide user input for framing the object of interest 310 towards the center of the viewpoint. In other words, the user 302 may look at the display of the user device 304 and simultaneous provides user input for small adjustments to the framing while zooming. In FIG. 3D, a reference 308 to the center of the image is illustrated.

Figure 3E:
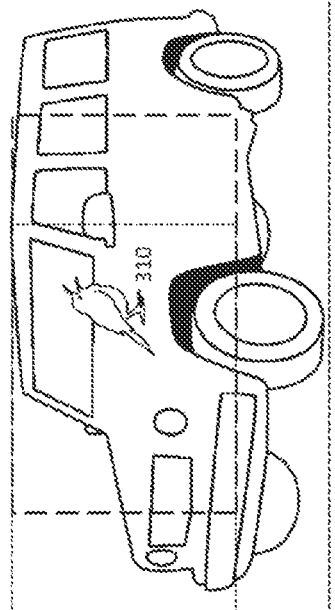
Figure 3E:
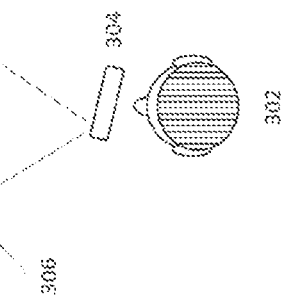
Figure 3E:
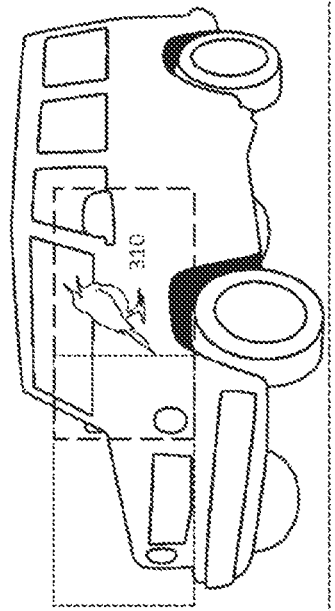
Figure 3E:
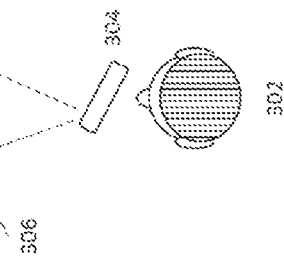

As one example, the user 302 may wish the bird (object of interest 310) to appear at the very bottom of the final zoomed video content. As the deviation is added in response to the input causing the zooming being performed, the user 302 makes somewhat larger adjustments to the framing that they would otherwise do because of the deviation. As the camera of the user device 304 zooms to the "wrong part" of the image, the user rotates the user device 304, in other words, provides rotating input, to adjust the framing. In this way, the deviation causes a visual output that may be perceived by the user 302 as a small error in framing and which may be smoothly removed by the user 302 by providing further user input, which in this example is rotating input. The resulting video capture resembles the capture illustrated in FIG. 3B. However, the rotating input enables obtaining calibration data required for capturing audio for generating spatial audio content. The initial zoom level 330 is thus rotated and zoomed to reach the final zoom level 335. Another example is illustrated in FIG. 3E. In this example, the deviation added also causes the user 302 adjust the framing such that zooming and orientation input is provided and the first zoom and rotation 340 of the video content is modified to the final zoom and rotation 345. The rotation input enabled the user device 304 to obtain suitable calibration data.

The amount of the deviation that is added to the zooming operation may be determined at least partly based on audio content analysis or video content analysis or a combination of both. For example, the user device, using the capturing algorithm that may be the trained model for capturing spatial audio content, may analyse whether there is likely more than one sound source in the scene to be captured as video. For example, if there is silence, there may not be a good possibility to collect calibration data. As another example, the user device may analyse and find at least one object of interest towards which the deviation to be added is to be made.

It is to be noted that in some example embodiments, optical and digital zoom may be combined. For example, switching from one camera to another may be performed differently during the zoom adjustment than in default operation.

Figure 4:
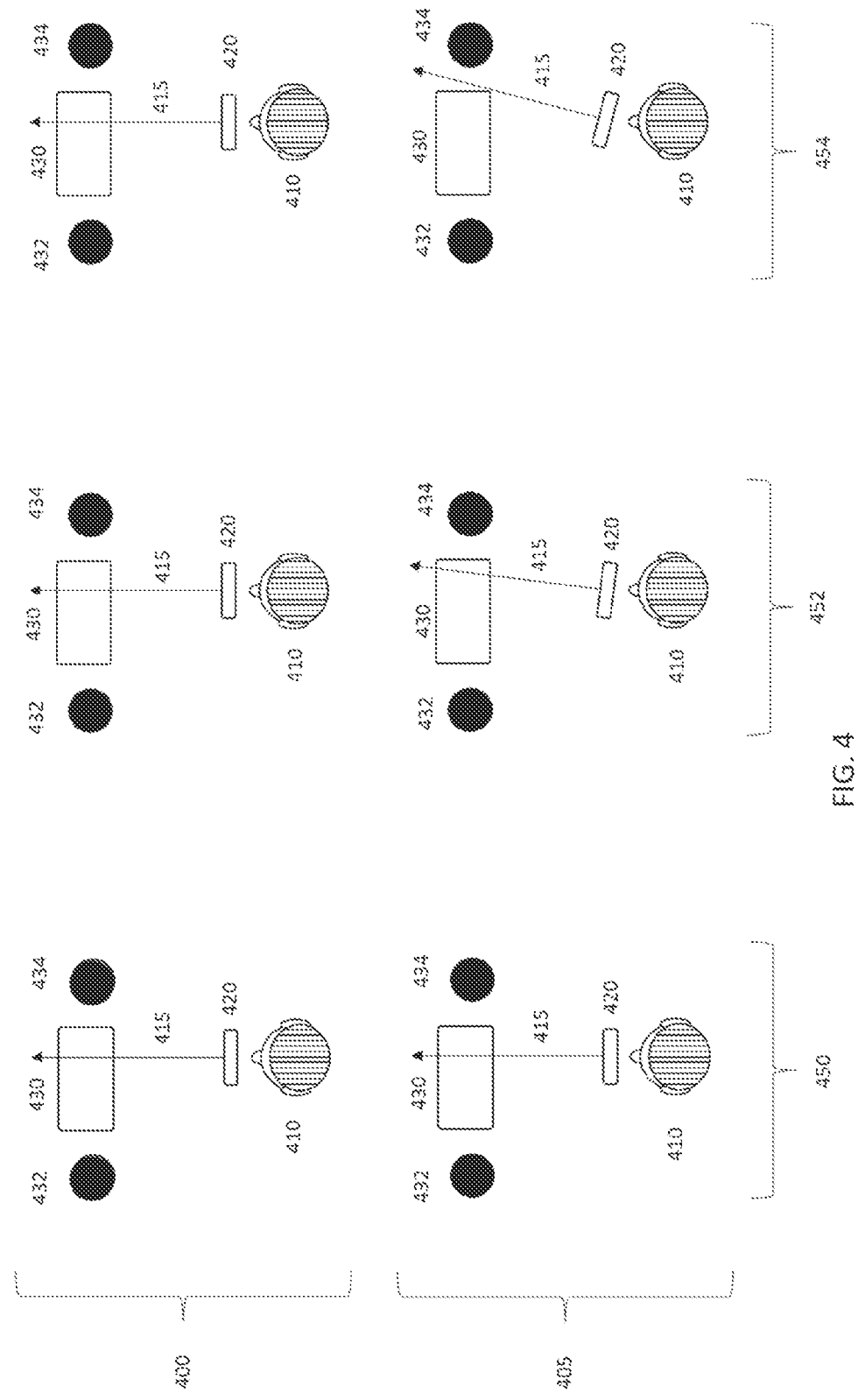
FIG. 4 illustrates an example embodiment of obtaining calibration data for adapting to a user device that is a new user device.

FIG. 4 illustrates an example embodiment of obtaining of calibration data for adapting to a user device 420 that is a new user device for the capturing algorithm comprised in the model executed by the user device 420 for capturing audio for generating spatial audio content. As with the previous example embodiments, more directions may be covered, and more and cleaner left-right separation may be achieved, when the user device 420 used for capturing audio is moved around. By adding deviation to the user input such as zooming input, the user 410 may be caused to move the user device 420 and as such, the deviation added may cause movement of the device with respect to its current orientation. In FIG. 4, the upper part 400 illustrates the situation when a user 410 is capturing video content of an object of interest 430 along with the sound sources 432 and 434 that are associated with the object of interest 430. The arrow 415 illustrates what is visible in the field of view of the camera comprised in the user device 420 that is used to capture the video content. It is to be noted that the camera may also be understood as a plurality of cameras. In the lower part 405 the capturing of the video content is illustrated when the deviation is added to cause movement of the user device 420. In the initial situation 450 is illustrate in left. In this situation, the sound source 432 is in front left with respect to the video capturing and the sound source 434 is in front right. The middle situation 452 shows a little deviation as the user device 420 is rotated towards right and the final situation 454 is when the user device 420 is turned to right such that the object of interest 430 is no longer visible, at least not completely, to the field of view 415. In this situation, the sound source 432 is more to the left than in the initial situation 450, while the sound source 434 is almost exactly to the front.

Figure 5:
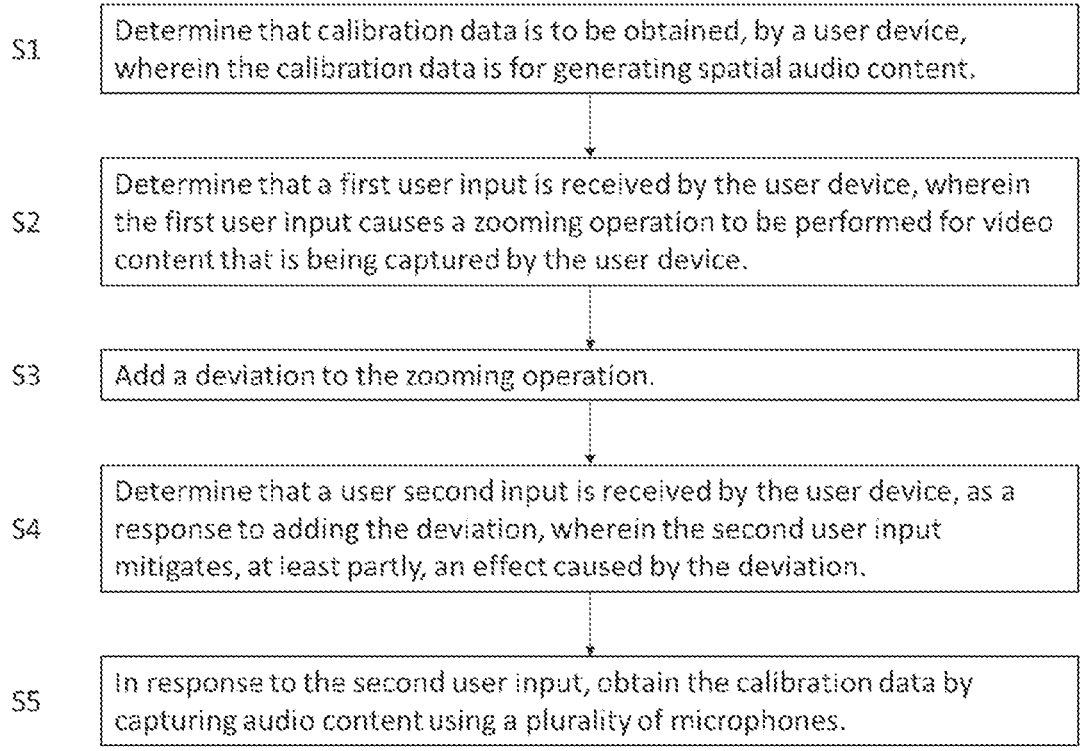
FIG. 5 illustrates a flow chart according to an example embodiment.

FIG. 5 illustrates a flow chart according to an example embodiment. In this example embodiment, first in block S1, it is determined that calibration data is to be obtained, by a user device, wherein the calibration data is for generating spatial audio content. Then, in block S2, it is determined that a first user input is received by the user device, wherein the first user input causes a zooming operation to be performed for video content that is being captured by the user device. Next, in block S3, a deviation is added to the zooming operation. After this, in block S4, it is determined that a user second input is received by the user device, as a response to adding the deviation, wherein the second user input mitigates, at least partly, an effect caused by the deviation. Finally, in block S5, response to the second user input, the calibration data is obtained by capturing audio content using a plurality of microphones.

A benefit achieved by the example embodiments described above is that a new user device with multiple microphones may be taken into use for capturing audio for generating spatial audio content. This is also applicable in case the total microphone array differs from what has been previously used. For example, when a user adds an accessory microphone, the user may do this with an intention of achieving better quality or improved functionality. Thus, the ability to adapt to such new configurations is beneficial.

Figure 6:
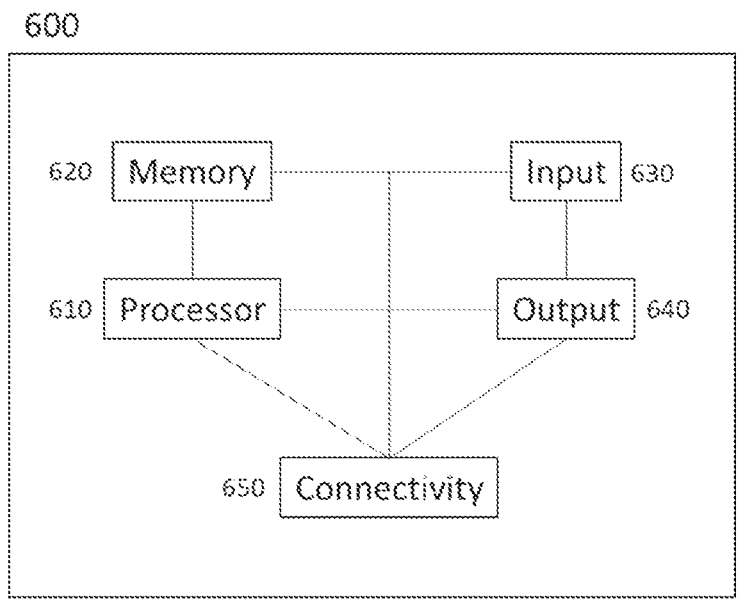
FIG. 6 illustrates an example embodiment of an apparatus.

FIG. 6 illustrates an exemplary embodiment of an apparatus 600, which may be or may be comprised in a device such as a user device according to an example embodiment described above. The apparatus 600 comprises a processor 610. The processor 610 interprets computer program instructions and process data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 stores computer readable instructions that are execute by the processor 610. For example, non-volatile memory stores the computer readable instructions and the processor 610 executes the instructions using volatile memory for temporary storage of data and/or instructions.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 630 may comprise an interface to which external devices may connect to.

The apparatus 600 also comprises an output unit 640. The output unit comprises or is connected to one or more displays capable of rendering visual content such as a light emitting diode, LED, display, a liquid crystal display, LCD and a liquid crystal on silicon, LCOS, display. The output unit 640 further comprises one or more audio outputs. The one or more audio outputs may be for example loudspeakers or a set of headphones.

The apparatus 600 may further comprise a connectivity unit 650. The connectivity unit 650 enables wired and/or wireless connectivity to external networks. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hardwired application specific integrated circuit, ASIC.

It is to be noted that the apparatus 600 may further comprise various component not illustrated in the FIG. 6. The various components may be hardware component and/or software components.

Example embodiments described herein may be implemented using software, hardware, application logic or a combination of them. Also, if desired, different functionalities discussed herein may be performed in a different order, some functionalities may be performed concurrently, and, if desired, some of the above-mentioned functionalities may be combined. Although various aspects of the invention are set out in the independent claims, other aspects of the invention comprise other combinations of features from the described embodiments and/or dependent claims with features of the independent claims and not solely the combinations explicitly set out in the claims.

It will be appreciated that the above-described example embodiments are purely illustrative and are not limiting on the scope of the invention. Other variations and modifications will be apparent to persons skilled in the art upon reading the present specification.

The invention claimed is:

1. An apparatus comprising:
   at least one processor; and
   at least one memory storing instructions that, when executed by the at least one processor, cause the apparatus at least to:
      determine that calibration data is to be obtained, by a user device, wherein the calibration data is for generating spatial audio content;
      determine that a first user input is received by the user device, wherein the first user input causes a zooming operation to be performed for video content that is being captured by the user device;
      add a deviation to the zooming operation;
      determine that a user second input is received by the user device, as a response to adding the deviation, wherein the second user input mitigates, at least partly, an effect caused by the deviation; and
      in response to the second user input, obtain the calibration data by capturing audio content using a plurality of microphones.

2. An apparatus according to claim 1, wherein the second user input is a rotating input.

3. An apparatus according to claim 1, wherein the deviation causes rendering of visual output, and the second user input is received in response to the visual output.

4. An apparatus according to claim 1, wherein the amount of the deviation is determined based on an analysis comprising audio content analysis, video content analysis or a combination of both.

5. An apparatus according to claim 4, wherein the analysis comprises determining if the video content being captured comprises more than one sound source.

6. An apparatus according to claim 1, wherein obtaining the calibration data comprises constructing the calibration data based on signals captured by the plurality of microphones.

7. An apparatus according to claim 1, wherein the plurality of microphones is comprised by the user device.

8. An apparatus according to claim 1, wherein at least one of the plurality of microphones is an external microphone connected to the user device.

9. An apparatus according to claim 1, wherein the calibration data is obtained using a machine learning model.

10. An apparatus according to claim 1, wherein the deviation is added to the zooming operation such that the deviation causes a non-central part of a field of view to be the center for the zooming operation.

11. An apparatus according to claim 1, wherein the apparatus is, or is comprised in, the user device.

12. A method comprising:
   determining that calibration data is to be obtained, by a user device, wherein the calibration data is for generating spatial audio content;
   determining that a first user input is received by the user device, wherein the first user input causes a zooming operation to be performed for video content that is being captured by the user device;
   adding a deviation to the zooming operation;
   determining that a user second input is received by the user device, as a response to adding the deviation, wherein the second user input mitigates, at least partly, an effect caused by the deviation; and
   in response to the second user input, obtaining the calibration data by capturing audio content using a plurality of microphones.

13. A method according to claim 12, wherein the second user input is a rotating input.

14. A method according to claim 12, wherein the deviation causes rendering of visual output, and the second user input is received in response to the visual output.

15. A method according to claim 12, wherein the amount of the deviation is determined based on an analysis comprising audio content analysis, video content analysis or a combination of both.

16. A method according to claim 15, wherein the analysis comprises determining if the video content being captured comprises more than one sound source.

17. A method according to claim 12, wherein obtaining the calibration data comprises constructing the calibration data based on signals captured by the plurality of microphones.

18. A method according to claim 12, wherein the plurality of microphones is comprised by the user device.

19. A method according to claim 12, wherein at least one of the plurality of microphones is an external microphone connected to the user device.

20. A non-transitory computer readable medium comprising program instructions stored thereon for performing at least the following:
   determining that calibration data is to be obtained, by a user device, wherein the calibration data is for generating spatial audio content;
   determining that a first user input is received by the user device, wherein the first user input causes a zooming operation to be performed for video content that is being captured by the user device;
   adding a deviation to the zooming operation;
   determining that a user second input is received by the user device, as a response to adding the deviation, wherein the second user input mitigates, at least partly, an effect caused by the deviation; and
   in response to the second user input, obtaining the calibration data by capturing audio content using a plurality of microphones.

* * * * *